J. P. DOUGHERTY.
COOKING UTENSIL.
APPLICATION FILED MAY 25, 1916.
1,240,427.
Patented Sept. 18, 1917.
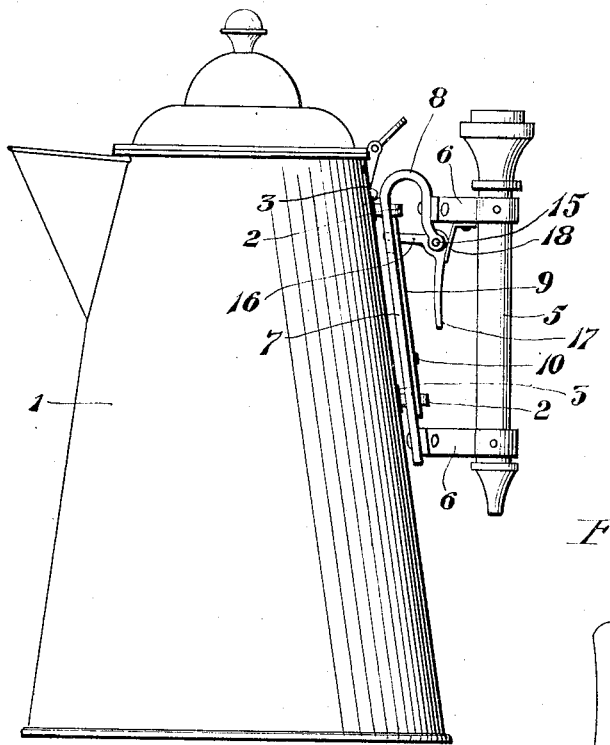
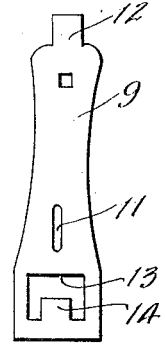
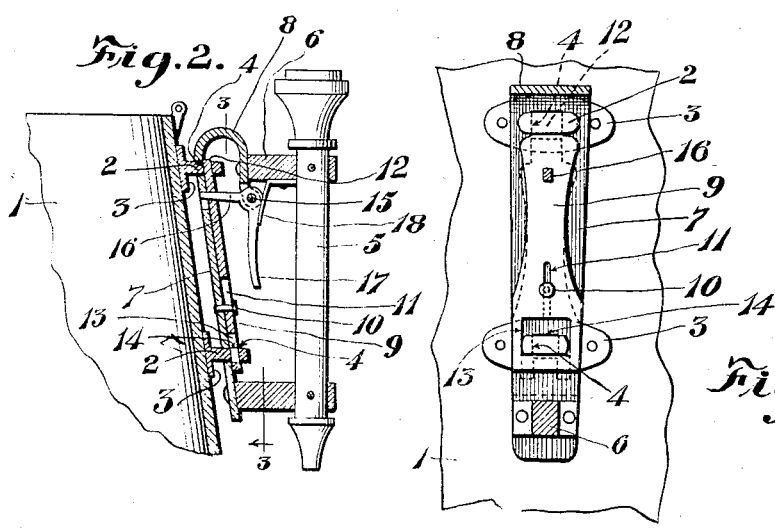
WITNESSES
INVENTOR
John P. Dougherty
BY
ATTORNEY

UNITED STATES PATENT OFFICE.

JOHN P. DOUGHERTY, OF HAZLETON, PENNSYLVANIA.

COOKING UTENSIL.

1,240,427.   Specification of Letters Patent.   Patented Sept. 18, 1917.

Application filed May 25, 1916. Serial No. 99,877.

*To all whom it may concern:*

Be it known that I, JOHN P. DOUGHERTY, a citizen of the United States, residing at Hazleton, in the county of Luzerne and State of Pennsylvania, have invented certain new and useful Improvements in Cooking Utensils, of which the following is a specification.

This invention has relation to cooking utensils, and has for an object the provision of a utensil having a handle which may be detached from the body portion of the utensil subsequent to placing the same upon a stove, whereby the handle is preserved from destruction from the heat, the handle being readily replaceable in connection with the utensil when the same is to be again removed from the stove.

In addition to the foregoing, my invention comprehends improvements in the details of construction, and arrangement of parts to be hereinafter described and particularly pointed out in the appended claims.

In the accompanying drawings, in which similar and corresponding parts are designated by the same characters of reference throughout the several views in which they appear;

Figure 1 is a view in side elevation of a cooking utensil embodying my invention.

Fig. 2 is a vertical section through the detachable handle and correlated mechanism.

Fig. 3 is a vertical section on the line 3—3 of Fig. 2, and

Fig. 4 is a detail face view of the latch bar.

With reference to the drawings, 1 indicates a cooking utensil which in the present instance is illustrated as a coffee pot, although it will be later apparent that my invention may be adapted for use in connection with other forms of cooking utensils. Located at that portion of the utensil usually reserved for the handle are a pair of lugs 2 having attaching portions 3 which are riveted or otherwise secured to the outer surface of the utensil. The lugs 2 are flattened, with said flattened portion disposed horizontally, and provided with vertical apertures 4.

The handle, which may be made of wood or other heat non-conducting material is indicated at 5, and is provided at each end with studs 6 to which is secured a keeper bar 7. The studs 6 are of different lengths, the upper one in the present illustration being the shortest, and the keeper bar 7 which is secured at its lower terminal to the lowermost stud, is provided with a recurvate portion 8 whereby its upper terminal is directed downwardly and secured to the upper lug. The keeper bar is provided with openings adjacent its terminals, said openings being of a size sufficient to receive the lugs 2.

A latch bar 9 is disposed on the inner face of the keeper bar, and is adapted for longitudinal movement thereon by means of a rivet 10 which extends through an elongated opening 11 provided centrally in the latch bar, and is secured to the keeper bar. The latch bar is provided at its upper end with a reduced extension 12, at its lower end with a rectangular opening 13, and an integrally formed extension 14 which projects upwardly and within the opening 13.

The upper terminal of the keeper bar is formed with a bifurcated portion intersected by transverse openings through which a pin 15 is extended. A bell crank is pivoted at its angular portion upon the pin, and is disposed within the bifurcated portion. One member 16 of the bell crank lever is seated within an opening provided in the latch bar, while its finger portion 17 is disposed substantially parallel with the handle. A flat spring member 18 is secured to the under side of the upper stud 6 and bears against the finger portion of the bell crank to urge the member 16 thereof upwardly.

Assuming that the handle is to be attached to the utensil, the handle portion 5 is grasped, and the finger portion 17 drawn toward the handle whereby the member 16 is depressed, thereby sliding the latch bar 9 in a downward direction. As a result of this movement, the openings at the upper and lower ends of the keeper bar are uncovered, said openings having been partly covered before such movement by the extensions 12 and 14. The handle may then be applied to the utensil by permitting the insertion of the lugs 2 into the aforementioned openings of the keeper bar, whereupon the finger piece 17 is released, and the latch bar moved upwardly under the influence of the spring 18, thereby seating the extensions 12 and 14 of the latch bar within the apertures 4 of the lugs. The handle having thus become positively associated with the utensil, it can only become disconnected by a reversal of the operation described above. It is to be noted that the end of the member 16 of the bell crank, is projected beyond the latch bar, and is guided within an elongated opening in the keeper bar, thereby providing a connecting means between the latch bar and the keeper in addition to the rivet 10.

While I have illustrated and described my invention with some degree of particularity, I realize that in practice various alterations thereof may be made, and I therefore reserve the right and privilege of changing the form of the details of construction, or otherwise altering the arrangement of the correlated parts, without departing from the spirit of the invention, or the scope of the appended claims.

Having thus fully described my invention what I claim as new and desire to secure by Letters Patent is:—

1. The combination with a utensil of a detachable handle comprising a keeper bar forming a part of the handle, apertures provided in the keeper bar, a slidable latch bar mounted on the keeper bar, apertured lugs on the utensil adapted to be seated in the apertures of the keeper bar, and means for urging the latch bar into engagement in the apertures of the lugs to retain the keeper bar and handle thereon.

2. The combination with a utensil of a detachable handle comprising a handle portion, a keeper bar secured thereto in spaced relation, apertures provided in the keeper bar, a latch bar slidably mounted upon the keeper bar and having extensions which during movement thereof intersect the apertures, apertured lugs on the utensil adapted to be seated within the first mentioned apertures, a bell crank pivotally mounted on the keeper bar with one arm engaging the latch bar to move same and its extensions into the apertures of the lugs, a resilient member engaging the bell crank to retain said latch bar in seated position, said bell crank affording means for withdrawing the latch bar from such engagement.

In testimony whereof I affix my signature in presence of two witnesses.

JOHN P. DOUGHERTY.

Witnesses:
  JOHN R. FALLON,
  PETER FALLON.

Copies of this patent may be obtained for five cents each, by addressing the "Commissioner of Patents, Washington, D. C."